United States Patent [19]
Kendall

[11] Patent Number: 6,165,252
[45] Date of Patent: Dec. 26, 2000

[54] ADSORPTION PROCESS AND APPARATUS

[75] Inventor: Robert M. Kendall, Sunnyvale, Calif.

[73] Assignee: Alzeta Corporation, Santa Clara, Calif.

[21] Appl. No.: 09/316,222

[22] Filed: May 21, 1999

[51] Int. Cl.[7] .............................. B01D 53/02; B01D 53/06
[52] U.S. Cl. .................................. 95/90; 95/113; 96/125; 96/131; 96/154
[58] Field of Search .............................. 95/107, 113, 900, 95/90; 96/125, 129, 131, 154

[56] References Cited

U.S. PATENT DOCUMENTS 5,167,679  12/1992  Maekawa et al. ..................... 96/125

FOREIGN PATENT DOCUMENTS

| 58-8284 | 2/1983 | Japan | 96/125 |
| 61-204018 | 9/1986 | Japan | 96/131 |
| 1449119 | 9/1976 | United Kingdom | 96/129 |

*Primary Examiner*—C. Scott Bushey
*Attorney, Agent, or Firm*—Paul W. Garbo

[57] ABSTRACT

The adsorption of at least one component of a gas mixture is improved by passing the gas through an adsorption zone wherein the adsorbent is distributed in rectilinear channels that stepwise both diminish in transverse size and hold a diminished weight of adsorbent. An adsorption zone with only two steps or stages of reduced channel size and reduced adsorbent weight in the flow direction of a gas passed therethrough permits much greater capture of the adsorbate component with an equivalent total weight of adsorbent when compared with the same adsorption zone with a single channel size and a uniform weight of adsorbent. Three or more stages of diminishing channel size and adsorbent weight in the flow direction of the gas passed therethrough may be chosen for separating some gas mixtures. Greater adsorbent capture effectiveness leads to longer adsorption periods between regeneration periods and reduced fuel consumption in regenerating an adsorbent distributed in two or more stages of diminishing weight and diminishing channel size. Fuel economy is an additional benefit of the novel system.

16 Claims, No Drawings

ADSORPTION PROCESS AND APPARATUS

BACKGROUND OF THE INVENTION

This invention relates to a process and apparatus for adsorbing one or more specific components from a mixture containing at least one other component and thereby separating the specific components from the mixture. More particularly, the invention is directed to improved adsorption by the use of graded channel sizes and graded adsorbent concentration diminishing along the flow direction of the mixture stream passed through the adsorber.

Adsorption technology is well developed and employed widely in industry. Two basic types of apparatus are in use: fixed beds of adsorbent particles and rotary wheels containing an adsorbent. Fixed beds are usually used in pairs so that while one bed is in operation for the adsorption of at least one component from a mixture containing that component, the other bed is being regenerated by desorption of the captured component. Periodically, the roles of the two beds are switched; the regenerated bed becomes the adsorber bed and the other bed undergoes regeneration. Hence, such paired adsorber beds are commonly called swing adsorbers.

Rotary wheel adsorbers are designed to permit the flow of a gaseous stream containing a component that is to be removed therefrom through one sector of the cylindrical adsorber, while a purging gaseous stream flows through another sector of the rotary wheel to effect regeneration of the adsorbent by dislodging the adsorbate. U.S. Pat. Nos. 3,780,498; 4,398,927 and 5,512,083 are illustrative of the highly developed rotary adsorber art. The numerous citations in these patents attest to the extensive adsorption technology.

In spite of the numerous proposals for improvements in adsorption technology, there remains an industrial demand for adsorbers of lower cost, less weight and floor space, and greater reliability. The invention is responsive to these needs.

Accordingly, a principal object of the invention is to arrange the adsorbent in a configuration that minimizes pressure drop of a gaseous mixture passed therethrough while the efficacy of the adsorbent is enhanced.

Another important object is to provide an adsorption process and apparatus of improved economic attractiveness.

A further object is to provide more compact and lighter adsorbers.

These and other features and advantages of the invention will be apparent from the description which follows.

SUMMARY OF THE INVENTION

In accordance with the invention, an adsorbent is disposed in an adsorption zone wherein the channels therethrough diminish in size (transverse cross section) in the direction of flow of the gaseous mixture undergoing removal of at least one component by adsorption and wherein the weight of adsorbent also diminishes in the same flow direction. This basic concept involves channels that decrease in size in two or more steps or stages while the weight of adsorbent in the channels also decreases with decreasing channel size.

A honeycomb-type structure with rectilinear channels therethrough is commonly used in rotary wheel adsorbers to support an adsorbent. Using two or more honeycomb-type structures with different channel sizes in an adsorber is a basic element of this invention. For example, FIG. 1A of U.S. Pat. No. 5,512,083 shows a wheel with a honeycomb of rectilinear channels formed by a corrugated metal strip that is combined with a flat metal strip. Pursuant to this invention, the exit portion of the rotary adsorber would be formed with smaller corrugations (channels) than those in the entry portion. Optionally, an intermediate axial portion of the rotary adsorber would have channels of a size intermediate the other two sizes to provide three stages of channel size diminution. Such structured, rectilinear channels in an adsorber, whether rotary or fixed bed, have other advantages besides low pressure drop of a gas stream passed therethrough. The size of the channels can be easily and accurately controlled and decreased stepwise without significantly increasing the cost of the adsorber.

As taught in U.S. Pat. No. 5,512,083, the metal strips forming the honeycomb-type structure of the adsorber are coated with an adsorbent by any of several methods such as spraying or slip coating. Pursuant to this invention, the weight of adsorbent applied to the metal structure is greatest in the entry portion or first stage of the adsorber and diminishes in each succeeding stage of decreased channel size. Accordingly, the improved adsorber of the invention is characterized by stepwise reduction of both channel size and adsorbent weight in the flow direction of the gas stream undergoing removal of at least one component.

The adsorption art is rich in the variety of adsorbents known for separating various components from streams of mixed components. For example, U.S. Pat. No. 5,512,083 names several zeolites for dehumidification and odor remediation of a cabin air stream. U.S. Pat. No. 4,629,476 teaches the use of a molecular sieve comprising a carbonaceous substrate derived from many diverse materials, such as nut shells, fruit pits and coal, for separating mixtures containing components of at least two different molecular diameters, molecular weights or molecular shapes.

DESCRIPTION OF PREFERRED EMBODIMENTS

In a preferred form, the invention can be illustrated by a conventional rotary adsorber that measures 16 inches in the axial or flow-through direction. For 8 inches from the entry face of the adsorber, the honeycomb-type metal structure, previously discussed, has 200 channels per square inch (cpsi) of entry face and is coated with a selected weight of an adsorbent zeolite. In the remaining 8 axial inches of the adsorber, the honeycomb has 450 cpsi and the zeolite coating thereon is weightwise half of that on the large-channel structure.

The very small channels mentioned in the foregoing illustration are available in the form of a ceramic honeycomb laminate produced by Seibu Giken of Japan, assignee of U.S. Pat. Nos. 4,886,769; 4,911,775; 5,194,414 and 5,348,922. In fact, this unusual product makes it industrially practical to form an adsorber, fixed bed or rotary wheel, with even three or more consecutive sections of stepwise reduced channel size in the flow direction of the gas stream requiring removal of at least one component. For example, the first section with 150 cpsi and a heavy coating of zeolite can adsorb about 50% of the undesired component, the next section with 200 cpsi and a reduced coating of zeolite can remove about another 35% of the component, and the last section with 300 cpsi and a light zeolite coating can serve as a further trap so that the stream discharging from the adsorber will have had 99% of the undesired component eliminated therefrom.

A conventional adsorber with a flow path of 18 inches and a honeycomb having 180 cpsi and an adsorbent loading of 12 pounds per cubic foot (ppcf) of adsorber structure captures 97% of the propanol content of an air stream passed through the adsorber for one hour at a velocity of 6 feet per second (fps). It will capture 99% of the propanol but only for 30 minutes. Changing the honeycomb in that adsorber to 150 cpsi and a loading of 16 ppcf of the same adsorbent for the first 6 inches of the flow path followed by 6 inches of a honeycomb with 200 cpsi and an adsorbent loading of 12 ppcf followed by 6 inches of a honeycomb with 300 cpsi and an adsorbent loading of 8 ppcf captures 99% of the propanol of the same air stream passed through the three stages of honeycomb for one hour at the same velocity. Hence, the simple change made pursuant to the invention reduces the residual propanol in the treated air stream by 67% using the same mass of adsorbent.

Another impressive benefit of graded channel size and graded adsorbent concentration diminishing in the flow direction of the treated stream is the resulting adsorbent's increased adsorbate capture effectiveness. Increased adsorbent effectiveness leads to longer adsorption periods and hence fewer regeneration periods. Fewer regeneration periods decrease the required quantity of heated regenerating gas so that fuel economy is a bonus of increased adsorbent efficacy.

A helpful guide in distributing the adsorbent in the successive channels of diminishing size suggests that the first and largest channels through which the stream containing an adsorbate flows should have at least 1.75 times the weight of adsorbent in the last and smallest channels traversed by the stream. In the case of an adsorber with three grades or steps of diminishing channel size, a further useful guide suggests that the first and largest channels should hold at least 0.75 times the total weight of adsorbent in the other two steps of diminishing channel size.

While the foregoing description of the invention has, for example, referred to a 16 inch adsorber as having an 8 inch section or segment and a successive 8 inch segment with smaller channels than those in the preceding segment, it should be noted that the honeycombs of successive segments need not abut one another. In some cases, it may be desirable to have a short confluent segment, e.g., about 1 inch, between the sequential or successive segments of diminishing channel size. Such a confluent segment with channels larger than those in the two segments abutted thereto can serve to receive and mix the gas streams from several channels and to distribute the mixed stream into an increased number of smaller channels. The surfaces of the confluent segment may be coated with adsorbent.

Variations and modifications of the invention will be apparent to those skilled in the art without departing from the spirit or scope of the invention. For example, an adsorption zone or adsorber need not be in a single vessel or wheel; for example, a vessel or wheel containing a honeycomb with only one channel size and one adsorbent loading followed by a vessel or wheel containing a honeycomb with a smaller channel size and a smaller adsorbent loading will achieve the benefits of the invention, when a stream with an adsorbate is serially passed through the two vessels or wheels. Accordingly, only such limitations should be imposed on the invention as are set forth in the appended claims.

What is claimed is:

1. In the adsorption process of passing a stream containing an adsorbate through an adsorption zone with substantially rectilinear channels therethrough and an adsorbent disposed in said channels, the improvement which comprises passing said stream through two or more sequential segments of said adsorption zone wherein each successive segment has smaller channels and less weight of said adsorbent.

2. The improvement of claim 1 wherein the stream is passed through a segment with channels not smaller than 200 cpsi and then through a segment with smaller channels but not smaller than 450 cpsi.

3. The improvement of claim 2 wherein the channels not smaller than 200 cpsi have at least 1.75 times the weight of adsorbent in the smallest channels.

4. The improvement of claim 1 wherein the stream containing an adsorbate is passed through three sequential segments with diminishing channel sizes having stepwise diminished adsorbent weights.

5. The improvement of claim 4 wherein the first segment has a channel size not smaller than 150 cpsi, the last segment has a channel size not smaller than 300 cpsi, and the weight of adsorbent in the first segment is at least 0.75 times the total weight of adsorbent in the other two segments.

6. In an adsorber having an adsorption zone with an entry side for a stream containing an adsorbate and an exit side for said stream, the improvement in that said adsorption zone comprises two or more sequential segments extending from said entry side to said exit side, and each successive segment has smaller channels and less weight of said adsorbent.

7. The improvement of claim 6 wherein a segment of the adsorption zone at the entry side contains a honeycomb laminate with channels that are not smaller than 200 cpsi and a segment at the exit side contains a honeycomb laminate with smaller channels that are not smaller than 450 cpsi.

8. The improvement of claim 7 wherein the channels in the segment at the entry side contain at least 1.75 times the weight of adsorbent contained in the channels in the segment at the exit side.

9. The improvement of claim 6 wherein the channels in the segment at the entry side have a size not smaller than 150 cpsi and are followed by channels in a successive segment not smaller than 200 cpsi, followed by channels in the segment at the exit side not smaller than 300 cpsi, and the weight of adsorbent in the channels in the segment at the entry side is at least 0.75 times the total weight of adsorbent in the channels in the other two segments.

10. The improvement of claim 9 wherein the adsorbent is zeolite, and the channels in the segment at the entry side have at least 0.75 times the total weight of zeolite in the channels in the other two segments.

11. An improved rotary wheel adsorber comprising at least two axially sequential segments of honeycomb laminate having channels of smaller size in each successive segment traversed by a gas stream passed therethrough, and an adsorbent disposed in said channels, the weight of said adsorbent being smaller in each successive segment.

12. The rotary adsorber of claim 11 wherein there are three axially sequential segments, the channel size of the first segment being not smaller than 150 cpsi, the channel size of the second segment being smaller than 150 cpsi but not smaller than 250 cpsi, and the channel size of the third segment being smaller than 250 cpsi but not smaller than 450 cpsi.

13. The rotary adsorber of claim 12 wherein the weight of adsorbent in the first segment is at least 0.75 times the total weight of adsorbent in the other two segments.

14. The rotary adsorber of claim 12 wherein the channel size of the second segment is not smaller than 200 cpsi, the channel size of the third segment is not smaller than 300 cpsi, and the weight of adsorbent in the first segment is at least 0.75 times the total weight of adsorbent in the second and third segments.

15. The rotary adsorber of claim 14 wherein the adsorbent is zeolite, and the weight of zeolite in the first segment is double that in the third segment.

16. The rotary adsorber of claim 11 wherein the adsorbent is zeolite and the weight of said zeolite in the first segment is at least 1.75 times that in the last segment.

* * * * *